United States Patent [19]

Sakaguchi et al.

[11] 4,037,948
[45] July 26, 1977

[54] PHOTOGRAPHIC CAMERA WHICH CAN USE A FILM CARTRIDGE HOUSING A FILM CONTAINING SOUND RECORDING BELT

[75] Inventors: Keiichi Sakaguchi, Yokohama; Yoshio Komine, Tokyo; Toshikazu Ichiyanagi, Tokyo; Mamoru Shimazaki, Tokyo; Kazuya Hosoe, Machida, all of Japan

[73] Assignee: Canon Kabushiki Kaisha, Tokyo, Japan

[21] Appl. No.: 461,425

[22] Filed: Apr. 16, 1974

[30] Foreign Application Priority Data

Apr. 20, 1973 Japan .................................. 48-45553
May 7, 1973 Japan .................................. 48-50905

[51] Int. Cl.² ........................................... G03B 31/02
[52] U.S. Cl. ......................................... 352/29; 352/72
[58] Field of Search ................... 352/26, 29, 72, 78, 352/27

[56] References Cited

U.S. PATENT DOCUMENTS

| | | | |
|---|---|---|---|
| 3,442,580 | 5/1969 | Winkler | 352/29 |
| 3,825,327 | 7/1974 | Kosarko et al. | 352/72 |
| 3,848,977 | 11/1974 | Scholz | 352/72 X |
| 3,893,756 | 7/1975 | Scholz | 352/29 |

Primary Examiner—L. T. Hix
Assistant Examiner—Alan Mathews
Attorney, Agent, or Firm—Toren, McGeady and Stanger

[57] ABSTRACT

A photographic camera in which a film cartridge, housing a photographing film having a recording belt capable of recording sound signal, can be loaded, wherein for the purpose of effecting the recording of sound signal simultaneously with photographing a sound signal recording head and a constant speed film running mechanism are provided at the sound signal recording part being separated from an intermittent film transport mechanism for running the above mentioned film with a constant speed. The above mentioned sound signal recording head can take an active state wherein sound signal recording on the above mentioned sound signal recording belt is possible and an inactive state wherein said recording is impossible, selectively, and the shifting from said inactive state to the active state is done in an association with the action of the locking means of the cover of a chamber for the above mentioned film cartridge so that simultaneous sound recording and photographing can be done immediately after the camera cover is locked.

24 Claims, 18 Drawing Figures

PHOTOGRAPHIC CAMERA WHICH CAN USE A FILM CARTRIDGE HOUSING A FILM CONTAINING SOUND RECORDING BELT

BACKGROUND OF THE INVENTION

1. Field of the Invention

The present invention relates to a photographic camera which can use a film cartridge housing a film having sound recording belt, and particularly to a camera having a sound signal recording means positioned at the sound signal recording opening of said film cartridge, and having a means to shift said recording means from an active position to an inactive position so that photographing can be done while sound signal is being recorded on the above mentioned film.

2. Description of the Prior Art

While a film for recording picture images of such cartridge type with no light leaking that its operation is simple is widely used recently in a field of small size motion picture, no such cartridge film with convenient handling that both picture image recording and sound recording are possible has been introduced yet.

But in these days, demand for such material and/or a system in which both picture and sound can be simply recorded on the same recording medium is increasing day by day, while such has being disclosed in U.S. Pat. Nos. 3,561,851 and 3,604,790, etc.

In order to load such a cartridge capable of recording picture and sound on the same recording medium as mentioned above into a camera main body in a simple manner without error and in such a state that both sound recording and photographing can be done completely, it is indispensable to provide such a sound recording element as a sound recording head, pinch rollers, etc. which are protruding into the inside of a camera cartridge chamber and must contact with the film surface for placing the camera in a state allowing sound recording, beside various elements for photographing such as for determining aperture position and for setting film sensitivity, etc. for placing the camera in a state allowing photographing. Therefore, such cartridge loading can not be done by a conventional method of cartridge loading used in a conventional camera.

SUMMARY OF THE PRESENT INVENTION

An object of the present invention is to provide a cine-camera in which loading of cartridge into a state wherein the above mentioned sound recording and photographing are possible in a simple, safe and sure manner, and to be more concrete, to provide a camera in which the above mentioned cartridge is set into a state wherein sound recording and photographing can be done in an association with a locking mechanism of the cover of the cartridge chamber which constitutes a part of a camera.

Another object of the present invention is to provide a camera for simultaneous sound recording and photographing in which a mean is provided to detect that the above mentioned cover of the cartridge chamber reaches the prescribed closing position and to allow the locking action of the above mentioned locking mechanism.

Still another object of the present invention is to provide a camera in which a means is provided to detect whether the film having sound signal recording belt forms a prescribed loop at the film path between the photographing opening of the cartridge which houses said film and the sound signal recording opening of the same so that simultaneous photographing and sound signal recording on the film can be conveniently done.

Other objects and features of the present invention will become apparent from the detailed descriptions of the invention which will be given below in reference to the drawings.

DESCRIPTION OF THE PREFERRED EMBODIMENTS

Figure 1:
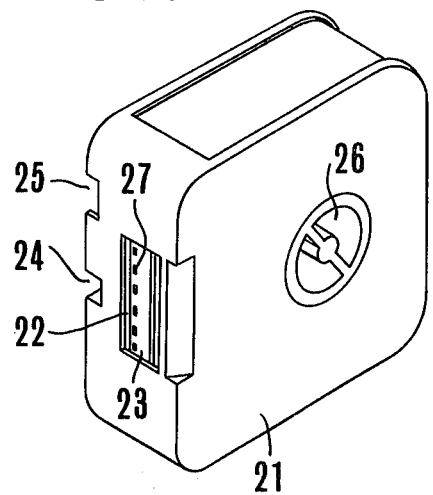
FIG. 1 is an oblique drawing of a film cartridge housing a conventional film which is used only for photographing.

FIG. 1 is an oblique view of a cartridge which has been widely used conveniently for recording picture images and can be operated simply with no light leaking, wherein 21 is a cartridge case, 22 is a film exposure window, 23 is a film, 24 is a guide for determining film position, 25 is a notch to indicate the film photo-sensitivity, 26 is a film wind up axle, and 27 are perforations.

Figure 2:
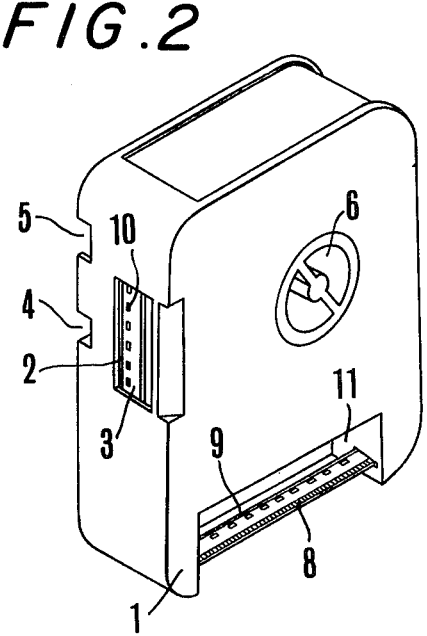
FIG. 2 is an oblique drawing of an example of a film cartridge housing a film which can have both photographing and sound signal recording made thereon.

FIG. 2 is an oblique view of a cartridge film which can be operated simply and allows picture film recording and sound recording, wherein 1 is a cartridge case, 2 is a film exposure window, 3 is a film, 4 is a guide for determining the film position, 5 is a notch to indicate the photo-sensitivity of film, 6 is a film wind up axle, 8 is a sound recording magnetic coating provided on the film, 9 is a balancing belt part for said magnetic coated part, 10 are film perforations, and 11 is a sound recording cartridge opening.

Figure 3:
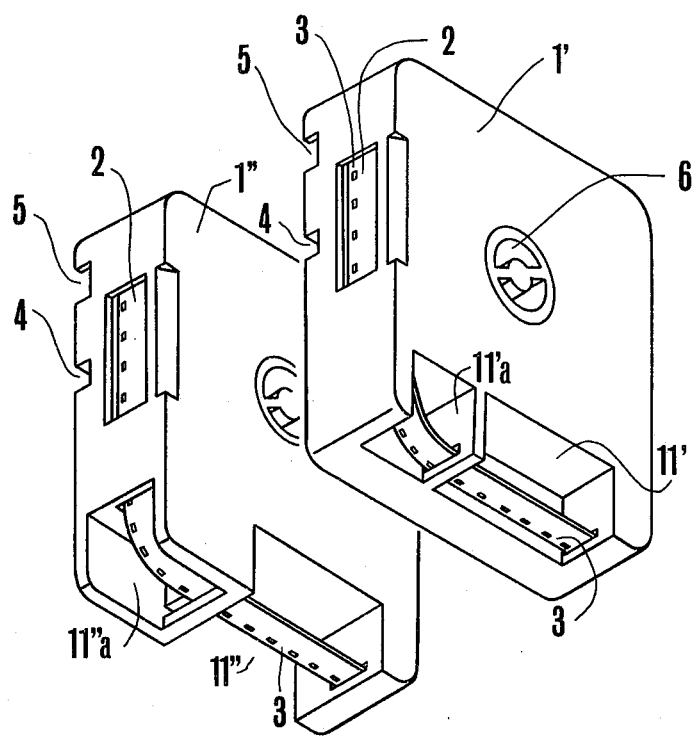
FIG. 3 shows oblique drawings for other two modified examples of the film cartridge shown in FIG. 2.

FIG. 3 shows other two examples of the cartridge film which can be handled simply and can have both picture image recording and sound recording done thereon, wherein 1' and 1" are cartridge cases, 3 is a film having a sound recording material, 2 is a photographing opening, 11' is sound recording opening, which is opened at the side wall of the cartridge case 1' to the bottom wall of the same. 11" is another opening to show an example of an opening which is completely opened through. 11'a, 11"a are loop detection openings which are opened from the side wall of the cartridge cases 1', 1" to the bottom wall of the same, wherein the film 3 is exposed at the film path between the opening 2 and the openings 11'a, 11"a. 11"a shows another form of the loop detection opening, which is opened from the front end of the cartridge case 1" to the bottom wall.

Figure 4:
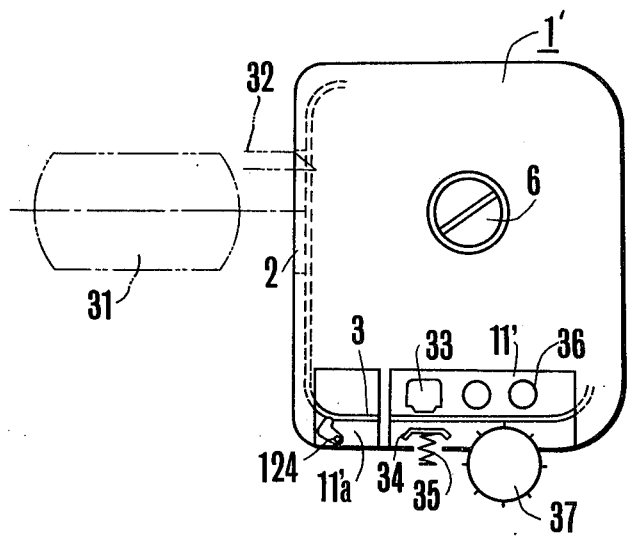
FIG. 4 is a front elevation of the cartridge in a state wherein various elements for sound signal recording provided at a camera side is in an inactive position for loading the film cartridge shown in FIG. 3 into a camera.

FIG. 4 is a drawing to show principle of the cartridge, in which picture image recording and sound recording can be made, shown in FIG. 3 as it is loaded into a camera, wherein each element described above for sound recording is in such a state as being placed at a position distant from the recording belt (but a camera main body and other elements necessary for photographing are not shown in the drawing). In said drawing, 1' is a cartridge main body, 2 is a film exposure window, 3 is a film having sound recording material, 6 is a film wind-up axle, 11' is a cartridge opening for sound recording, 31 is a photographing lens system, 32 is a film pull-down claw, 33 is a sound recording head, 34 is a pad, 35 is an electric member pushing up the pad always, 36 are film guide rollers, and 37 is a constant speed film transport sprocket engaged with the perforations of film (or a such film transport member as pinch rollers to be described later). A loop detection piece 124 is provided at the opening 11'a.

In this state the portion of film appearing at the sound recording opening 11' and the various elements for sound recording are separated from each other as described above, and the loading of the cartridge into a camera can be allowed only in this state. Of course sound recording can not be done in this state.

Figure 5:
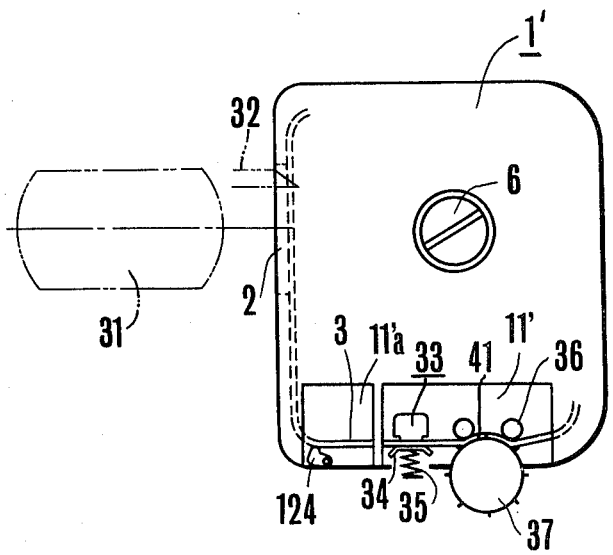
FIG. 5 is a front elevation of the same in a state that the above mentioned elements for sound signal recording is shifted from the state shown in FIG. 4 to active position for sound signal recording.

FIG. 5 shows a state wherein the sound recording means shown in FIG. 4 is shifted from an inactive state to the active state for sound signal recording, wherein elements common with those in FIG. 4 are identified with same numbers and explanation thereof is omitted. As being apparent from the drawing, the sprocket 37 for film transport presses the guide rollers 36 with film inserted therebetween, also the magnetic head 33 is in a state of pressed contact with the head pad 34 with film inserted therebetween.

Figure 6:
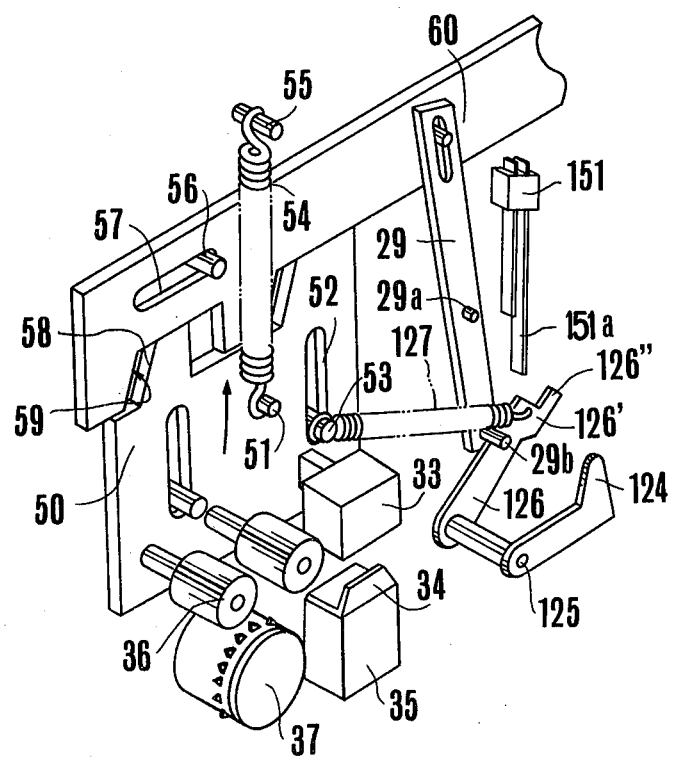
FIG. 6 is an enlarged oblique view to show details of the elements for sound signal recording shown in FIG. 4.

FIG. 6. is a detailed schematic drawing of elements necessary for recording out of the above mentioned principle drawing, wherein each element for sound recording is still in an inactive position which will not allow sound recording yet.

The above mentioned pad 34, the elastic material 35 for pad and a sprocket 37 are placed at a positioned fixed to a camera main body (not shown in the drawing), while the film guide rollers 36 and the sound recording head 33 are placed on a movable plate 50 with which the guide pin 53 fixed on the camera main body engages and which is guided by a groove 52 and is shifted up and down.

Also a pin 51 is erected on the movable plate 50 and an elastic material 54 such as a coil spring, etc. is positioned between the pin 51 and a pin 55 fixed on the main body, to bias the movable plate 50 always to upward direction. At the upper part of the movable plate a tapered plane 58 is provided and can engage with a tapered plane 59 formed at the lower end of a movable plate guide member 60 which engages with a guide pin 56 fixed on the camera main body with its long hole 57 and can move in left and right directions.

When the guide member 60 is in a free state, the guide member 60 is placed at the left hand position in the drawing by the above mentioned elastic material 54 and the tapered planes 58, 59, while the movable plate 50 is positioned at an upper part in the drawing and elements necessary for sound recording are at a separated position, and thus insertion of the film will be easy.

Further, a rotating lever 29 is provided in a pin-slot engagement relationship with the guide member 60, and said lever is rotatable around the axle 29a which serves as an axial support and a pin 29b which can engagedly contact with the loop detection member 126 is provided at a forward end part of the lever. A coil spring 127 is placed between one end part 126' of the loop detection member and the above mentioned pin 53, and by this spring 127 the loop detection member 126 and the pin 29b are placed always in an engagedly contacting state. Thus the loop detection member 126 can rotate with its contacting point with said pin 29b serving as a fulcrum. This loop detection member 126 is coupled integrally with a loop detection place 124 with an axle 125 which is axially supported to the main body, and the other end 126" of the member 126 is positioned to face the switching piece 151a of a switch 151 which intermittently cut out the circuit of a sound recording film transport motor circuit (to be described later).

Figure 7:
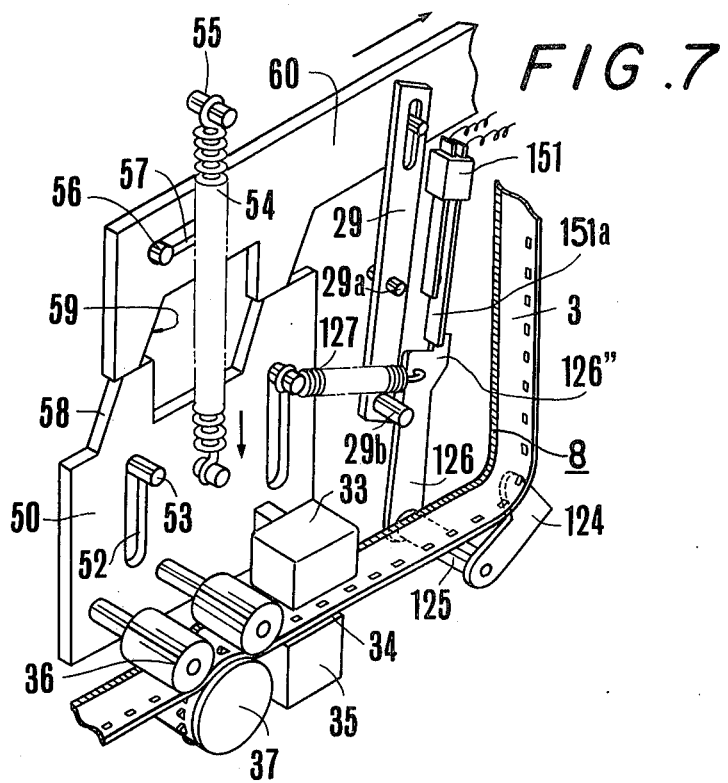
FIG. 7 is an enlarged oblique view to show details of the elements for sound signal recording shown in FIG. 5.

FIG. 7 is a detailed schematic drawing of important elements necessary for sound recording out of the above mentioned principle drawing, being in a state allowing sound recording.

When the above mentioned movable plate guide member 60 is shifted to the direction shown by the arrow in an association with the cartridge chamber cover locking action which is to be described later, by the tapered planes 58 and 59 the movable plate 50 is shifted downward in the drawing by the pin 53 and the engaging groove 52 and at the same time the film guide rollers 36, the sound recording head 33 provided on the movable plate 50 hold the film 3 with the sprocket 37 and the pad 34 sandwiching the same therebetween to place it in a sound-recordable state.

The member 60 and associated elements constitute change over means whereby the sound signal recording means of the present invention may be changed over from a first state where it is functionally coupled for sound recording to a second state where sound recording is prohibited.

At this time the film loop detection piece 124 is brought out from such position shown in FIG. 6 as evacuating from the film path to the action position shown in FIG. 7 in which loop detection is possible. This is because the rotating member 29 rotates in a clockwise direction in the drawing with the axle 29a serving as a fulcrum along with the shifting of the movable plate guide member 60 to the arrow direction and the loop detection member 126 rotates in a counterclockwise direction around the axle 125 being pulled by the spring 127 as much as the pin 29b is shifted.

Figure 8:
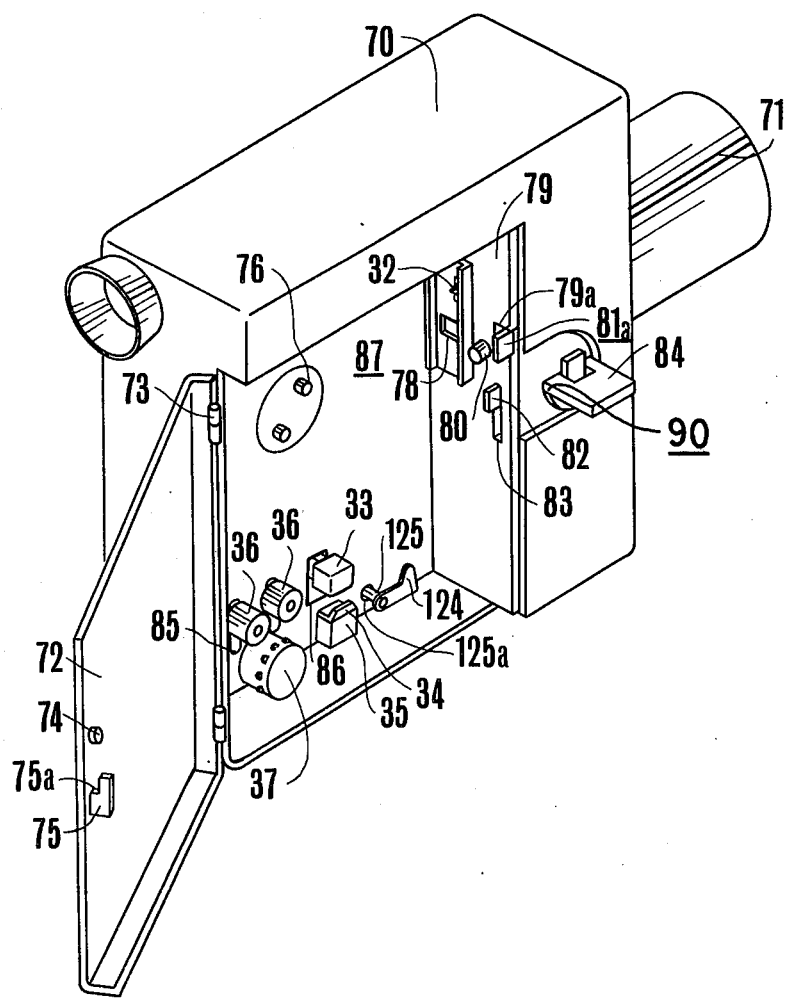
FIG. 8 is an external oblique view of an example of a motion picture camera which allows the use of a film cartridge housing a film on which sound signal recording is possible, in a state that its rear cover is opened.

FIG. 8 is an external oblique view of a motion picture camera in such a state that the cover of the cartridge chamber housing a film on which both picture image recording and sound recording can be made, is opened. In the drawing, 70 is a camera main body, 71 is a photographing lens, 72 is a cartridge housing chamber cover which can be opened and closed from/to the camera main body and a projection 74 and a projection 75 having a notch 75a are positioned at the inner plane of said chamber cover, wherein in a state when the cartridge housing chamber cover is closed, the projection 74 engages with the forward end part 81 (refer to FIG. 9 and 10) of a safety mechanism member 81 protruding into the inside 87 of the cartridge housing chamber at a side notch 79a of an aperture base plate 79, while the projected part of the projection 75 engages with the locking member 82 protruding into inside of the cartridge housing chamber from the long groove 83 of the aperture base plate 79, respectively. 76 are wind-up claw at the camera side engaging with the cartridge wind-up axle, and 77 is an aperture at camera engaging with the film exposure window 2 of the cartridge (refer to FIGS. 2 and 3), 78 is a picture frame opened on the aperture. 80 is a position determining pin to engage with the guide 4 for film position determining of the cartridge, and 84 is a lock knob for the chamber cover to cover the cartridge housing chamber. Also at inside of the cartridge housing chamber, the above mentioned film transport claw 32, the sound recording head 33, the padding elastic member 35, a pair of film guide rollers 36, the film transport sprocket 37 and the film loop detection piece 124 are provided. The cover 72 of the above mentioned film housing part is attached to the camera main body 70 in an openable and closable manner by hinges 73. And a slot 85, slot 86 and a perforation 125a are provided to make shiftable the film guide rollers 36 the sound recording heads 33, and the film loop detection piece 124, respectively, which stick out to the film housing part 87, and each of the above mentioned members 33, 36 and 124 is protruding out of the slot.

Figure 9:
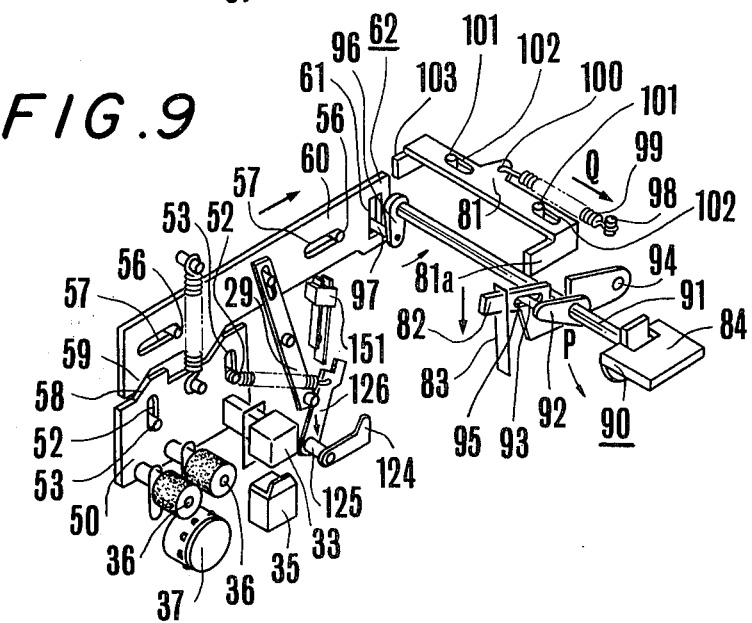
FIG. 9 is a detailed oblique view of the sound recording means provided in the motion picture camera shown in FIG. 8 and an operation control mechanism thereof, particularly showing the state where the above mentioned sound recording means is an inactive state.

FIG. 9 is a detailed drawing of the linking mechanism for the cartridge housing chamber cover locking knob of the camera (camera main body is omitted to make the drawing readily understandable) which can house a cartridge enabling both the picture image recording and the sound recording to be done, being linkable with the elements necessary for sound recording, wherein the drawing shows the state when the cartridge housing chamber cover is opened. In this state (the cartridge housing chamber cover is not shown in the drawing), the film guide rollers 36 and the film driving sprocket 37 which are the elements necessary for sound recording, are separated from each other and so are the sound recording head 33 and the pad 34, while the loop detection piece 124 is evacuated from the film path so that the loading and unloading of the cartridge can be done easily. 84 is a cartridge housing chamber cover locking knob which can be folded with the axle 90 served as the center so that it will not be obstruction at the outside of the outer casing of a camera, also it can be rotated to the direction of P in the drawing with the rotating axle 91 serving as a center of rotation, and when it is thus folded down said knob 84 is housed in a dented part at outer casing of a camera, not forming an obstacle in handling of a camera, and can be fixed at said locked position. The state shown in the drawing is as the cartridge housing chamber cover is opened. A holding plate 92, for holding a pin 93 engaged with a long groove 95 perforated on the member 82 for shifting the above mentioned lockable member 82 around the axle 94, is provided on the rotating axle 91 of the cartridge housing chamber cover locking knob, and a holding plate 96, to hold a pin 97 engaged with a long groove 61 perforated on the above mentioned movable plate guide member 60 to make said member 60 slidable, is provided at an end part of the axle, wherein when the knob 84 is rotated from the state shown in the drawing to counterclockwise direction the axle 91 is rotated to counterclockwise direction (direction of P in the drawing) so that the holding plate 92, the pin 93 and the holding plate 96, the pin 97 can shift respectively the lockable member 82 downward and the movable plate guide member 60 to right hand direction in the drawing (refer to FIG. 10). It has been already described in FIG. 6 and FIG. 7 that along with the shifting of the movable plate guide member 60 to right hand direction the slide plate 50 is moved downward and the loop detection member 126 can be brought to the loop detection position.

The portion drawn in the upper part of the drawing is a blocking means or safety mechanism part of this mechanism, wherein 81 is a member for a safety mechanism, 98 is a pin fixed on the camera main body, and a spring 99 is hung between a hole 100 perforated in a protruding one part on the member 81 and the pin 98 and force is given always to direction of Q in the drawing, so that the other end 103 of the member 81 joins with the other end 62 of the movable plate guide member 60, being guided by a guide groove 102 perforated in the member 81 and the guide pin 101 fixed on the main body to prevent rightward movement of the member 60 so that the movable plate guide member 60 can not make erroneous movement. The other end 81a of the member 81 is placed at such position as can contact with the pin 74 of FIG. 8.

Figure 10:
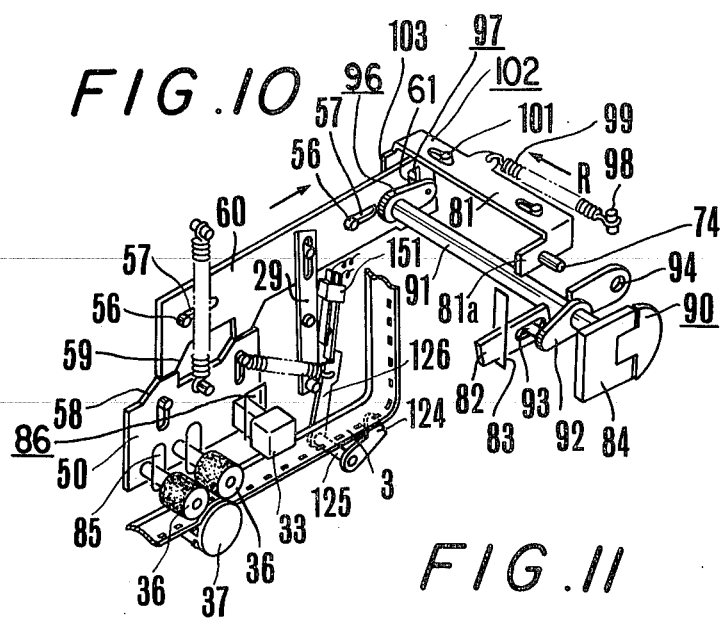
FIG. 10 shows the state wherein the sound signal recording means and its operation control means shown in FIG. 9 are in an active position for sound recording.

FIG. 10 is a detailed drawing of a linking mechanism for the cartridge housing chamber cover locking knob of a camera (the camera main body is not shown) which can house a cartridge capable of picture image recording and sound recording, to be linked with the elements necessary for sound recording, wherein same mechanism as in FIG. 9 is shown, and especially the state wherein the cartridge housing chamber cover is closed is shown (the cartridge housing chamber cover is not shown). In this state the relations between the film guide rollers 36 and the film driving sprocket 37 and between the sound recording head 33 and the pad 34 which are elements necessary for sound recording, are in such a pressure contact as holding the film therebetween so that sound recording can be made. That is, by closing the cartridge housing chamber cover 72 shown in FIG. 8 after the cartridge 1 is loaded to the cartridge housing part 87 in a proper state, the protrusion 74 sticking out to the inside of the cover 72 engages with the right hand shoulder part 81*a* of the member 81 for safety mechanism to shift the member 81 to the direction of R in the drawing against the spring 99, separating the other end 103 of the member 81 from its contacting position with the end part 62 of the movable plate guide member 60 so that the movable-plate guide member 60 can become shiftable to the arrow direction in the drawing. As the cartridge housing chamber cover 72 is precisely closed the forward end of the lockable member 82 can come into the notch 75*a* of the projection 75 provided at the inner plane of the cover 72 (refer to FIG. 8), then the cartridge chamber cover locking knob 84 can for first time become rotatable in a direction of R shown in FIG. 9.

By precisely closing such cartridge chamber cover 72, the projection 74 pushes the end part 81*a* to shift the member 81 for safety mechanism to the direction of R in FIG. 10, placing the lockable member 82 in a swingable state, and by rotating the cartridge housing cover locking knob 84 in a counter-clockwise direction, the cover 72 holds the lockable member 82 between the notch 75*a* of the projection 75 and itself thus the cover 72 is completely locked. And at the same time by rotating the locking knob 84 in a counter-clockwise direction (direction P shown in FIG. 9) the holding plate 96, the pin 97 provided on the rotating axle 91 are rotated in a counter-clockwise direction so that the movable plate guide member 60 is shifted in the direction of the arrow in the drawing through the long groove 61 provided at the movable plate guide member 60, and by this as has been described previously the elements necessary for sound recording can be pressure contacted against the film surface and the film loop detection member is shifted to its detection position through the engagement of the tapered plane 59 on the member 60 and the tapered plane 58 on the movable plate 50 (refer to FIG. 7).

At this position shown in FIG. 10 (FIG. 7), that is the first position at which the sound recording means can record the sound information on the film having sound recording belt and the loop detection means makes detection, the camera operator can make sound recording and the photographing simultaneously. When such sound recording and photographing are completed and the film cartridge is taken out of a camera, the above mentioned sound recording means can be shifted to the position separated from the above mentioned sound recording belt and the film loop detection means can be shifted to the position evacuated from the film path, that is to the second position, in an association with the action to release the locking means of the cover of the film housing part as said cover is opened. Therefore the film cartridge can be easily taken out of a camera as soon as the cover is opened.

Figure 11:
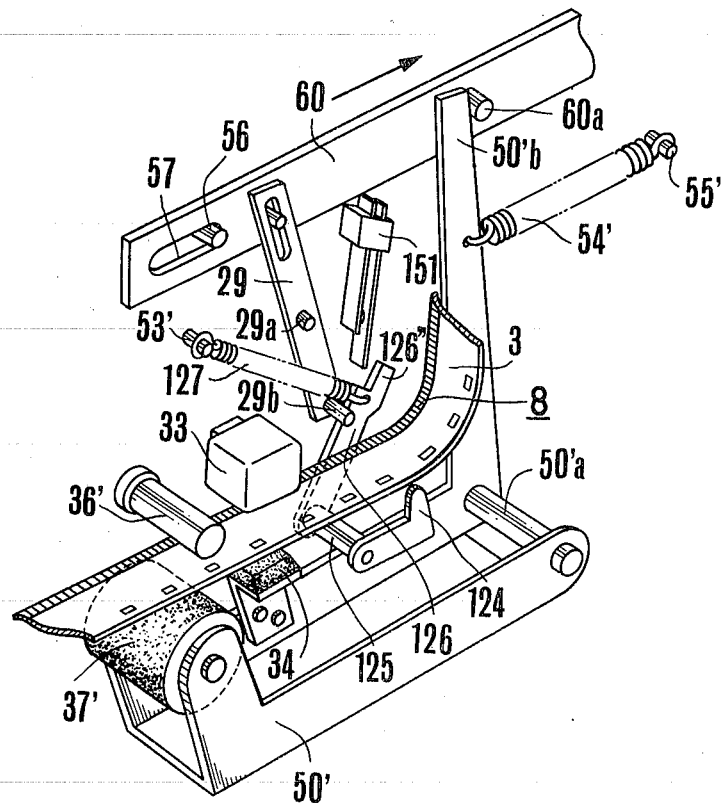
FIG. 11 is a detailed enlarged oblique view to show another modified example of the sound signal recording means shown in FIGS. 6 and 7.

FIG. 11 shows a modified example of the mechanism shown in FIGS. 6 and 7, showing such a structure in which the magnetic head 33 is fixed while the head pad 34 is shifted and at the same time a capstan 36' supported at the main body in a freely rotatable manner as a constant speed running means for the film and a pinch roller 37' which is freely pressure contactable with said capstan 36' through the film are provided. The elements common with the FIG. 6 and FIG. 7 are identified with the same numbers and the elements functionally corresponding to the same are shown by the same numbers with a dash. The pinch roller 37' and the head pad 34 are carried by the rotating member 50' being rotatably supported on the axle 50'*a* which is axially supported in a rotatable manner on the main body. The other end 50'*b* of this rotating member is so provided as always contacting with the pin 60*a* planted on the member 60 by the spring 54' fixed on the pin 55' fixed on the main body. The loop detection member 126 is so provided as always contacting with the pin 29*b* by the coil spring 127 fixed on the pin 53' which is fixed on the main body. The other set up of the loop detection means is same as that described before.

To shift the sound signal recording means and the constant speed film transport means with above mentioned set-ups from the non-active positions shown in FIG. 11 to their active positions for sound signal recording, the closing and opening cover locking means 84 such as that shown in FIG. 8 to FIG. 10 is operated to shift the movable plate guide member 60 in the direction of arrow shown in the drawing thus said shifting can be done in same manner as mentioned above, also the loop detection means 124, 125, 126 can also be shifted from their resting positions to their loop detection positions.

What has been mentioned above is only a few examples of the motion picture camera according to the present invention, which is not naturaly limited to these examples. The present invention is to make the shifting of the sound recording means to such position as allowing recording on the sound recording belt on the film which enable simultaneous sound recording to be done and shifting from said position to the sound recording stopping position in an association with the locking of the cover of the film housing chamber of a camera and with the releasing said locking. Thus in connection with loading and unloading of the film cartridge such as shown in FIG. 2 and FIG. 3, the sound recording means can be shifted to an active position in association with the closing action of the cover of the film housing part (the action of closing the cover and locking the same), and at the same time said sound recording means can be shifted to a non-active position in association with the releasing action of said cover (the releasing action of said locking and opening of the cover), thus the invention provides such advantages that the handling of the film cartridge on which simultaneous sound recording can be made becomes very simple and operation becomes very easy. While setting of the film sensitivity used, etc. is done conventionally in association with the opening and closing of the cover of a camera, in the present invention the above mentioned sound recording means can be operated simultaneously in addition to above, thus multi-purpose and multi-functional action can be done by one handling operation as opening and closing of a cover which is an inevitable step in operating a camera, thus providing great advantages for a camera operator.

Next, the set up and function of the means to make the adjustment of film transport according to the detection operation by the film loop detection means shown in FIG. 4 to FIG. 11 will be explained.

Figure 12:
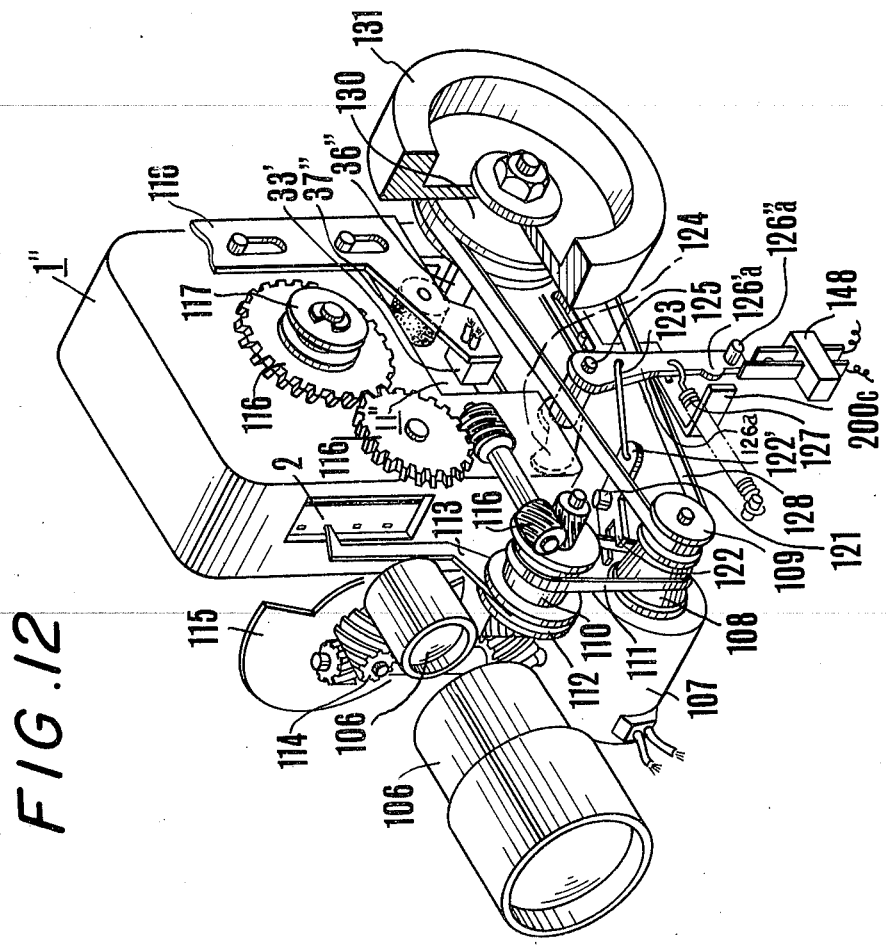
FIG. 12 is an oblique view of another example of a film transport mechanism and a sound recording means at a camera into which the film cartridge shown in FIG. 3 can be loaded.
Figure 13:
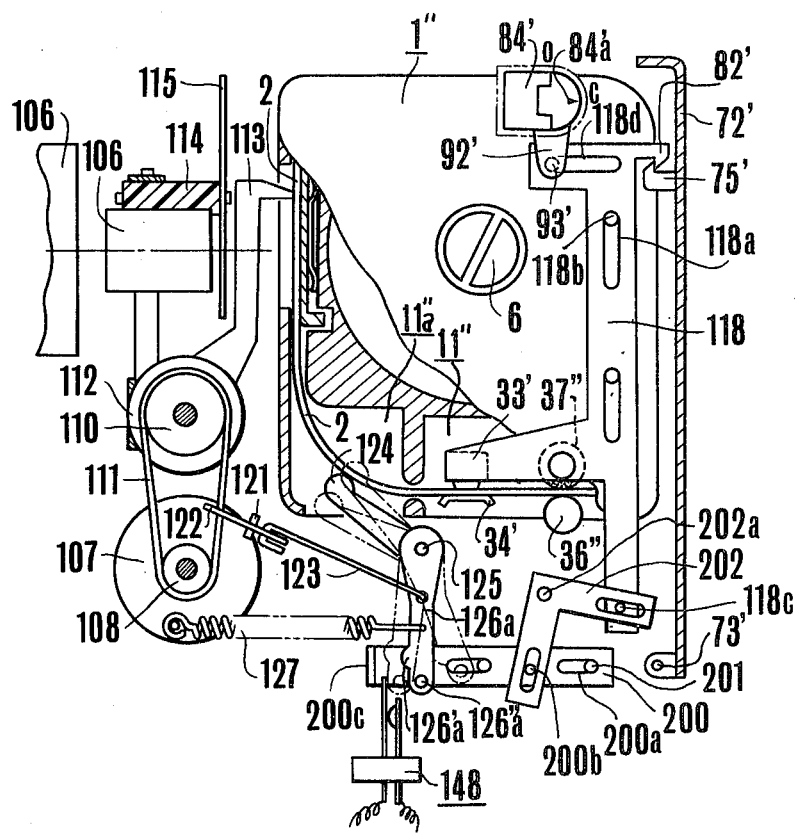
FIG. 13 is a front elevation of important parts showing a film transport means, a sound signal recording means, and a film loop detection means between the photographing opening of said cartridge and the opening for sound signal recording, out of the mechanism shown in FIG. 12.

FIG. 12 is an oblique view of the first example of the film transport control device which responds to the loop detection means in a simultaneous sound recording camera using such cartridge film as shown in FIG. 3, and FIG. 13 is a plan showing important mechanism of FIG. 12, indicating the wind-up chamber side of the cartridge partially in section. In FIG. 12 and FIG. 13, 1' is said cartridge case, 2 is film, 106 is a photographing lens, 107 is a photo-graphing film transport motor. 108 is a pulley with conical shape for stepless speed changing being directly coupled with the driving shaft of the motor 107 and transmits the rotation to a conical pulley 110 at the follower side through a belt 111. 112 is an eccentric part to activate a film transport claw and is directly coupled with the pulley 110. 114 is a gear train to transmit the rotation of the pulley 110 for rotating a shutter blade 115. 116 is a gear train to transmit the rotation of the pulley 110 and to rotate a wind-up part 117 having a slip mechanism for activating the wind-up shaft 6 of the cartridge. 118 is a sliding plate and has integrally the sound recording head 33' and the pinch roller 37''. The sound recording head 33' and the pinch roller 37'' can be made engageable and disengageable with the film 2 at such a position as fitting to the sound recording opening of the cartridge by the operating means 84' shown in FIG. 13. 109 is a pulley directly coupled with the driving shaft of the motor 107 to drive a pulley 130 through a belt 128. The pulley 130 has coaxially a capstan 36'' to make the film transport at the sound recording opening and has a flywheel 131. 124 is a loop detection piece entering into the loop detection opening 11''a of the cartridge to engage with the loop of the film 2, and can be rotated around the axle 125, further it has integrally a lever 126a. The lever 126a has integrally a projection 126'a and a pin 126''a. The lever 126a is also biased always in a clockwise-direction by the spring 127, thereby the loop detection piece 124 always has rotating force in a clockwise direction. 122 is a variable speed member engaged with the stepless speed change mechanism between the motor 107 and the transport claw mechanism. Said varible speed member 122 can be rotated around the axle 121 and its one end 122' is in a linked relationship with the above mentioned lever 126a by the linking member 123.

The film chamber cover 72' in FIG. 13 has an engaging claw part 75' and is mounted to a camera in an openable and closable manner by the hinge 73'. The sliding plate 118 has at its one end a locking claw 82' which is engageable with said claw part 75' and has at the other end a pin 118c. A bell crank 202 which is coupled with said pin 118c in a pin-slot engaging relationship is rotatable with an axle 202a served as a fulcrum axle, and the other end of the same engages with a sliding member 200 having a pin 200b' in a pin-slot engaging relationship. Said sliding member 200 has a slot 200a engaged with a pin 201 planted on the main body and is freely slidable to the slot direction, while the other end of the same has a riser part 200 c. This riser part 200c faces with a projection 126'a of the above mentioned lever 126a. A knob 84' to lock the opening and closing cover 72' is provided as an operating means for sliding the sliding plate 118 to the direction of the slot 118a by its pin-slot engagement with the pin 118b. This knob can be folded and rotated in the same manner as shown in FIG. 8 to FIG. 10, and has an indication mark 84'a. This knob is connected with a linking plate 92' and a pin 93' is planted on said plate, wherein said pin engages with the slot 118a of the above mentioned sliding plate 118.

Next the function of such set up will be explained.

When the cover 72' is opened, the indication mark 84'a on the lock knob 84' is matched with the fixed mark "O" on the camera, and at this time the sliding plate 118 is positioned above the position shown in FIG. 13 through the linking plate 92' and the pin 93'. Therefore along with said sliding plate, the magnetic head 33' and the pinch roller 37'' are separated from the head pad 34' and the capstan 36'' and are at non-active position wherein sound signal recording is impossible. At the same time the sliding member 200 comes to the extreme right hand position in the drawing through the bell crank 202, and the riser part 200c engagedly contacts with the projection 126'a to rotate the lever 126a to counter-clockwise direction. Therefore the loop detecting piece 124 is held at a position being released from the opening 11''a. In this state after the film cartridge is loaded into the prescribed position of a camera, the opening and closing cover 72' is closed, then as the locking knob 84' is rotated until it matches with the fixed mark "C" on a camera, the sliding plate 118 comes down in a linked movement therewith to the position shown in FIG. 13, thus the locking claw 82' engages with the claw part 75' to completely lock the cover 72' and at the same time the magnetic head 33' and the pinch roller 37'' can be made to pressure contact with the head pad 34' and the capstan 36'' respectively with the film 2 held therebetween. Also at the same time the loop detection member 126a is so rotated through the bell crank 202 and the sliding member 200 that the loop detection piece 124 enter into the loop detection opening 11''a of cartridge.

Next explanations will be made on the function of the mechanism to detect the difference in speed between the photographing film transport and the sound recording film transport by the loop detection means and to adjust the both transport speeds.

In the embodiment shown in these drawings, the intermittent transport of photographing film and constant speed transport at the sound recording part is done through the above mentioned pulleys and belts using one motor 107 as its driving power source. As the mode of said two transport is different in the film path between the photographing opening and the sound recording opening, a film loop forming part becomes necessary. When both transports are done properly said loop repeats increase and decrease within a prescribed range, but when the both transport speeds vary remarkably, it is necessary to provide a means to properly return the abnormal state to a normal state. In the embodiment shown in FIG. 12 and FIG. 13, when the loop of the film 2 varies by generation of the speed difference between the photographing film transport and the sound recording film transport, the loop detection piece 124 is rotated thereby, and its movement is transmitted to the variable speed member 122 through the lever 126a and the coupling member 123, then by shifting the position of the belt 111, the speed ratio of the pulleys 108, 110 varies, thereby the speed of the claw transport part increases or descreases, thus proper loop can be maintained.

A switch 148 is a switching means to be quickly opened by the projection 126'a of the lever 126a at the time of such an abnormal state that the loop of the film 2 completely disappear to cut out the driving circuit of the film transport motor for securing safety.

Figure 14:
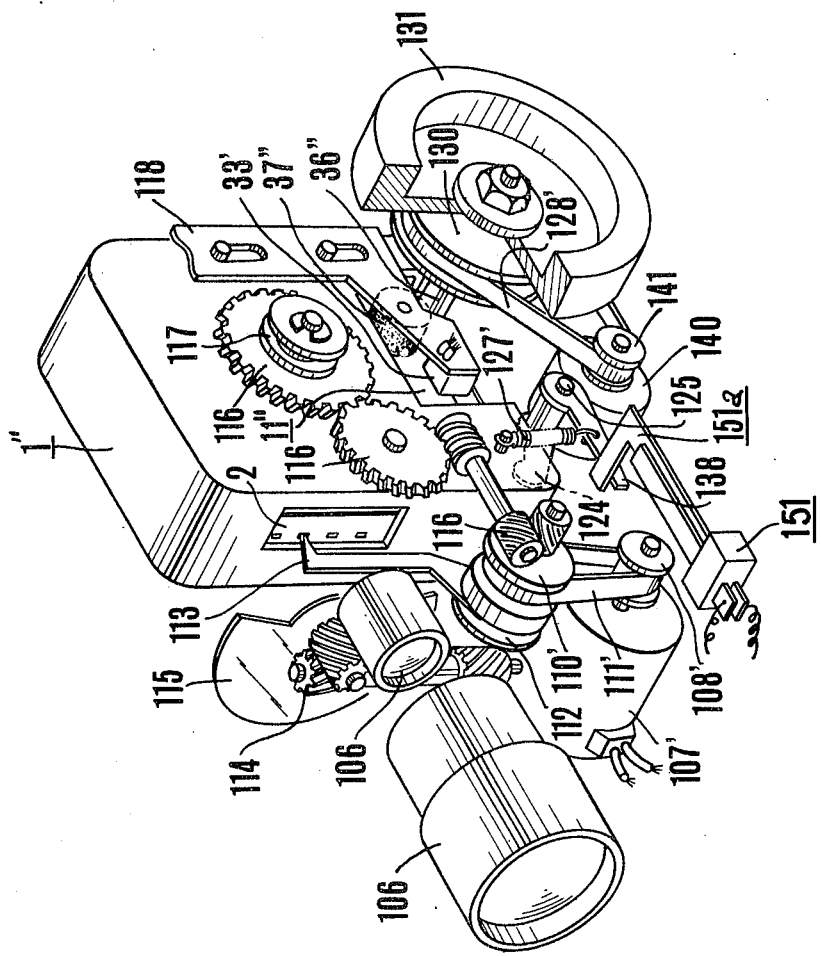
FIG. 14 is an oblique view of important mechanism containing a film transport mechanism of different mode from what is shown in FIG. 12.

FIG. 14 is an oblique view of the second example of the film transport control device of a simultaneous sound recording camera using such a film cartridge as shown in FIG. 3. While in the example shown in FIG. 2 and FIG. 3 both photographing film transport and the sound recording film transport are done by one driving motor, an independent motor is used in this example respectively. The elements corresponding to the previously described elements are identified in this drawing with same numbers. 107' is a photographing film transport driving motor and transmits the rotation through a belt 111' to a pulley 110' which activates a transport claw 113 and a shutter blade 115. 140 is a sound recording film transport driving motor and drives the pulley 130 having a capstan 36" and a flywheel 131 by a pulley 141 directly coupled with the motor through a belt 128'. 124 is the above mentioned loop detection piece which is rotatable around the axle 125 and has integrally an arm 138, being biased always in a clockwise direction by the spring 127'. 151 is a switch device to control the photographing film transport driving motor 107', which engages with the above mentioned arm 138 and is closed when the amount of the film loop becomes less than the prescribed value.

Figure 15:
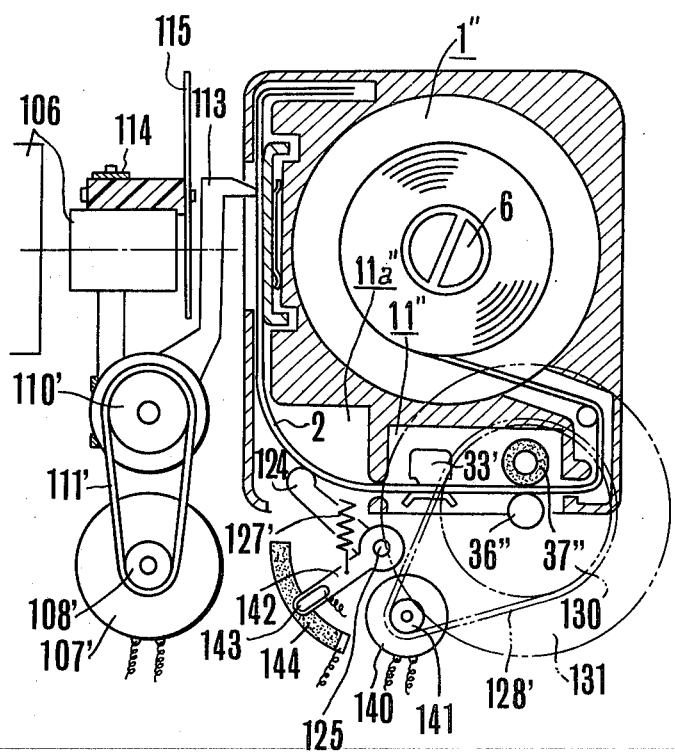
FIG. 15 is a front elevation of important parts in another example of a film transport control mechanism as shown in FIG. 14 using two drive motors, wherein a variable resistance is used for controlling the same.

FIG. 15 is a front elevation to show the important mechanism of the third example employing a variable resistor in a control system, in a film transport control device using two driving motors as in FIG. 14. The parts in FIG. 15, except for the loop detecting part, have the same set-up as in FIG. 14. Therefore they are identified with the same numbers and explanations thereof will be omitted. In the drawing 124 is the above mentioned loop detection piece and 125 is its rotating axle. 142 is an arm integral with detection piece 124 and is always biased in a clockwise direction by the spring 127', wherein the loop detection piece 124 always contacts with the loop part of the film 2.

144 is a variable sliding resistor and 143 is a contacting piece which contacts therewith and is attached to the arm 142. The function of these parts shall be explained later together with that for the electric circuit diagram which is to be explained later.

Figure 16:
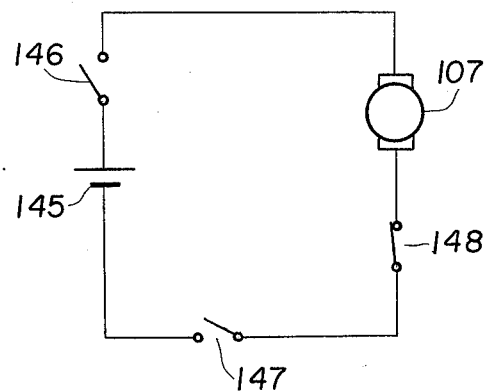
FIG. 16 is an electric circuit connection diagram to show an example of a switching device to control the mechanism shown in FIG. 12 and FIG. 13.

FIG. 16 is an electric circuit diagram to explain the switch device 148 shown in FIG. 2 and FIG. 3, wherein 107 is the above mentioned film transport driving motor, 145 is a power source, 146 is a main switch, and 147 is a release switch. 148 is a switch which is normally placed in a closed state and becomes OFF when the loop of film completely disappears. By this at the time of such an extremely abnormal condition that this loop disappears, this switch 148 is opened to stop the film transport.

Figure 17:
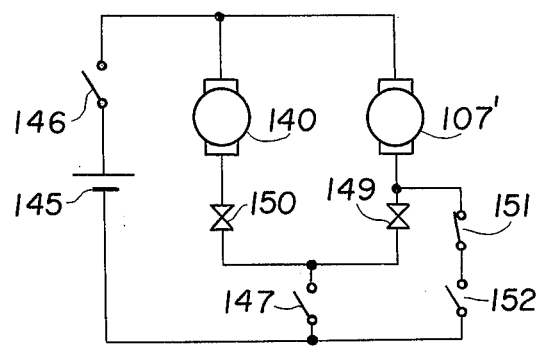
FIG. 17 is an electric circuit connection diagram to show an example of the switching device to control the mechanism shown in FIG. 14.
Figure 18:
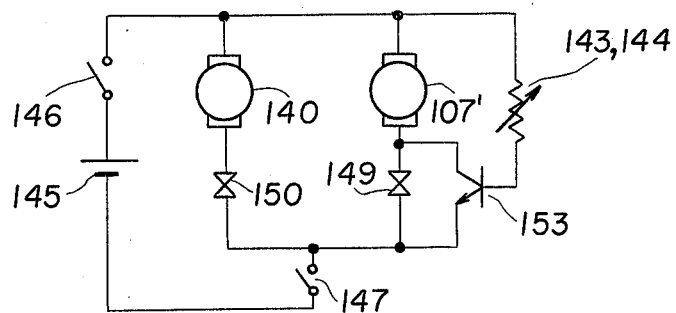
FIG. 18 is an electric circuit connection diagram to show an example of a switching device to control the mechanism shown in FIG. 15.

FIG. 17, FIG. 18 are electric circuit diagrams for such examples as using two driving motors shown in FIG. 14, FIG. 15 and FIG. 17 corresponds to FIG. 14 while FIG. 18 corresponds to FIG. 15. In these drawings, 107' is the above mentioned photographing film transport driving motor and 149 is a governor to keep the speed constant. 140 is a driving motor for transporting a sound recording film and 150 is its governor. 145 is a power source, 146 is a main switch and 147 is a release switch. 151 is a switching device explained in FIG. 14, and 152 is a switch which is normally opened and is closed by loading a film cartridge. In FIG. 18, 143, 144 are variable resistors explained in FIG. 15. 153 is a transistor positioned in parallel with the governor 149 of the driving motor for transporting photographing film.

The function of the three examples of the present invention explained in the above mentioned drawings will be explained below supplementarily. In the first example explained in FIG. 12 and FIG. 13 employing one driving motor, transport of the sound recording film for the purpose of sound recording is normally done as known well by a capstan and pinch rollers. Contrary to this, transport of the photographing film is done in an intermittent manner using perforations of the film, therefore a loop part is necessary by all means between the two, wherein because of unavoidable slip between the above mentioned capstan 36" and the film 2, this loop increases or decreases over or below the normal position giving undesired effects over recording of picture image or sound. Therefore it is essential to keep this loop always at a constant volume. On the other hand slight variation in speed could cause trouble in sound recording as known well, said control of loop is to be done by varying the speed of the photographing film transport. Now, when slip takes place between the capstan 36" — pinch roller 37" and the film 2 in FIG. 13, the loop of film increases. By this the loop detection piece 124 is pushed and is shifted to the state shown by imaginary lines below. By this the belt 111 between the pulley 108 of the motor and the pulley 110 is shifted to the front end in FIG. 12, and as the diameter of the pulley 108 becomes small while the diameter of the pulley 110 becomes large, the speed of photographing film transport becomes slow, thus the loop returns to a normal shape and by this the belt 111 returns to its original position thus normal transport can be secured. As has been explained, according to the first example of the present invention in a simultaneous sound recording camera using a film cartridge having a photographing opening and a loop detection and sound recording opening, normal and non-troubled photographing can be done even if one film transport driving motor is used and a capstan, etc. is used for transporting sound recording film. Also, when film is used up during photographing with the main switch shown in FIG. 16 closed and the relay switch 147 closed, and the perforation transport of film is discontinued as the end of film corresponds to the transport claw 113, the loop by sound recording film will disappear. At this time the loop detection piece 124 is largely rotated in a clockwise direction and the switching device 148 is opened by the pin 126"a of the lever 126a to stop the film transport driving of the camera, thus completion of film will be indicated. Also when a trouble takes place between the film perforation and the transport claw the circuit is blocked in a similar manmer, thus detection of trouble is also possible. It is also useful to connect this switching device and various indication devices.

In the film transport control device using two film transport driving motors as shown in FIG. 14 and FIG. 15, the photographing film transport motor 107' is to be controlled based on the sound recording film transport motor 140.

First the example shown in FIG. 14 is explained by the circuit diagram shown in FIG. 17. First, when a film cartridge is loaded into a camera in a state when the main switch 146 is closed, the switch 152 is closed. While the circuit of the photographing film transport motor 107' is closed by this to transport the film, the loop of film is immediately formed and the switch 151 is opened, therefore the motor 107' is stopped and preparation for photographing is completed. When the release switch 147 is closed the sound recording film transport motor 140 and the photographing film transport motor 107' are driven. Since this set up is so adjusted that the photographing motor 107' has slightly slower film transport speed than that of the sound recording motor 140 by adjusting the governors 150 and 148, the loop of the film 2 becomes small before long, and thus the loop detection piece 124 is rotated in a clockwise direction and the arm 138 closes the switch 151. By this the motor 107' makes high speed rotation without the governor 149 to have the film form loop again and open the switch 151. This switch 151 is same as the switch 151 in the set up shown in FIG. 6 to FIG. 11.

Next, the example shown in FIG. 15 will be explained by the circuit diagram of FIG. 18. First, when a film cartridge is loaded to close the main switch 146 and the release switch 147, the sound recording film transport motor 140 and the photographing film transport motor 107' are driven. As the volume of loop becomes small during photographing, the loop detection member 124 is rotated in a clockwise direction and the sliding piece 143 of the variable resistor is also rotated making the resistance value of the variable resistors 143, 144 small, and making the amount of current flowing through the transistor 153 becomes large and the motor 107' gains high speed. Soon the film has loop again and the resistance value of the variable resistors 143, 144 becomes large, making the amount of current flowing through the transistor 153 small and the motor 107' will have low speed. Thus the rotation will be continued soon in such a state that the speeds of film transport by the two motors 140 and 107' become equal. The govenor 149 is necessary for securing good starting characteristics, while operation can be done without the same.

As has been explained above according to the second and third examples on the loop detection means according to the present invention, in a simultaneous sound recording camera using a film cartridge having a photographing opening and a loop detection and sound recording opening, always constant volume of loop can be maintained allowing always stable simultaneous sound recording and photographing by controlling the photographing film transport motor by the loop detection means based on the sound recording film transport motor, employing two film transport driving motors.

What is claimed is:

1. A motion picture camera adapted to utilize a film cartridge housing a sound signal recording photographic film, comprising:
   a cartridge housing chamber to house said cartridge;
   a cover for said housing chamber, said cover being movable against said housing chamber to close and open the chamber;
   sound signal recording means for recording sound signals on said film, said recording means being adapted to be changed over between a first state to functionally couple with said film for sound recording and a second state to release said coupling with the film for prohibiting sound recording on the film;
   change over means to change over said recording means between said first and second states, said change over means being operatively connected with the recording means and operable manually from outside of the camera;
   blocking means operatively engaging with said change over means to prohibit operation of said change over means to change over the recording means from the second state to the first state, said blocking means being movable between a first position to prohibit said operation of the change over means and to a second position to enable said operation of the change over means, said blocking means being shifted by said cover from its first position to its second position when said cover closes said housing chamber;
   locking means for locking the cover at a state wherein the housing chamber is closed, said locking means being operatively connected to the change over means to lock the cover in association with operation of the change over means to change over the recording means from its second state to its first state, and to release the locking of the cover in association with operation of the change over means to change over the recording means from its first state to its second state;
   with both the setting of the sound recording and the locking of the cover being effected simultaneously by one operation of the change over means only when the cover is in a state closing the cartridge housing chamber.

2. A motion picture camera according to claim 1, wherein the photographic film has a magnetic track for sound signal recording and the sound signal recording means includes:
   a sound signal recording head member for recording sound signals magnetically on said track, said head member being fixedly disposed within the housing chamber with at least the magnetic track of the film being made to contact with the head member for sound recording;
   a pressure member for contacting at least the magnetic track of the film with the head member for sound recording, said pressure member being movable between a first position to press at least the magnetic track of the film against the head member and to a second position to release said pressing;
   said change over means being operatively connected to the pressure member and said pressure member being shifted between the first and second positions by said change over means.

3. A motion picture camera according to claim 2, wherein said change over means include:
   a setting member to shift the pressure member between the first and second positions, said setting member being operatively connected to the pressure member and movable between a first position to shift the pressure member to its first position and a second position to shift the pressure member to its second position; and
   a handling member to shift the setting member between its first and second positions, said handling member being manually operable from outside of the camera and operatively connected to the setting member:
   said blocking means operatively engaging with the setting member at its first position, and by blocking the shifting of said setting member from its second position to its first position, prohibiting operation of the handling member to shift the setting member from its second position to its first position;
   the locking means being operatively connected to the handling member to lock the cover in association with the operation of the handling member to shift the setting member from its second position to its first position and to release the locking of the cover in association with the operation of the handling member to shift the setting member from its first position to its second position.

4. A motion picture camera according to claim 3, further comprising:
urging means to always bias the blocking means towards its first position, said urging means being operatively connected to the blocking means, the blocking means being forcibly shifted by the cover to its second position resisting the biasing force of said urging means when the cover closes the housing chamber.

5. A motion picture camera adapted to utilize a film cartridge housing a sound signal recording photographic film, comprising:
a cartridge housing chamber to house the cartridge;
a cover for said housing chamber, said cover being movable against said housing chamber to close and open said chamber;
sound signal recording means for recording sound signals on said film, said recording means being adapted to be changed over between a first state functionally coupled with the film for sound recording and a second state with said coupling with said film released to prohibit sound recording on the film;
setting means to change over the recording means between its first and second states, said setting means being operatively connected to the recording means and movable between a first position to set the recording means at its first state and a second position to set said recording means at its second state;
blocking means operatively engaging with the setting means to block the shifting of the setting means from its second position to its first position, said blocking means being movable between a blocking position to block the setting means and a non-blocking position to release said blocking, and forcibly shifted by the cover to the non-blocking position when said cover closes the housing chamber;
handling means to shift the setting means between its first and second positions, said handling means being manually operable from outside of the camera and operatively connected to the setting means to be operable only when the blocking means is at its non-blocking position; and
locking means to lock the cover in a state in which the housing chamber is closed, said locking means being operatively connected to the handling means to lock said cover in association with the operation of the handling means to shift the setting means from its second position to its first position and to release the locking of the cover in association with the operation of the handling means to shift the setting means from its first position to its second position;
both the setting of sound recording and the locking of the cover being accomplished simultaneously by one operation of the handling means only when the cover closes the housing chamber.

6. A motion picture camera according to claim 5, wherein the film cartridge has an opening for permitting sound signal recording on the film, and the sound signal recording means includes:
a sound signal recording head for recording sound signals on the film, said head being fixedly disposed within the housing chamber at a location to be positioned in said opening when the cartridge is housed in the chamber, with at least a portion of the film made to contact the head at said position for sound recording; and
a pressure pad for contacting at least a portion of the film with the recording head for sound recording, said pad being movable between a first position to proceed into the opening of the cartridge to press at least the portion of the film against the recording head and a second position to retreat from said opening to release said pressing;
the setting means being operatively connected to the pressure pad to shift the pressure pad between its first and second positions.

7. A motion picture camera according to claim 6, wherein the sound signal recording means further includes a supporting member to so support the pressure pad that said pad can be shifted between its first and second positions, said supporting member being operatively connected to said setting means and operating to shift the pressure pad between its first and second positions in association with the shifting of the setting means between its first and second positions, the pressure pad being fixedly disposed on the supporting member.

8. A motion picture camera according to claim 7 wherein the setting means includes:
a sliding member slidingly shifted between a first position to shift the pressure pad to its first position and a second position to shift said pressure pad to its second position, said sliding member being operatively connected to the supporting member and operating to shift the pressure pad through the supporting member between its first and second positions by slidingly shifting between said first and second positions thereof;
the handling means being operatively connected to said sliding member to slidingly shift the sliding member between its first and second positions;
the blocking means operatively engaging the member at its blocking position to block the sliding-shifting of the sliding member from its second position to its first position.

9. A motion picture camera according to claim 8, wherein the handling means includes:
a handling member rotatable against the camera to slidingly shift the sliding member between its first and second positions, said handling member being manually operable from outside of the camera and operatively connected to the sliding member;
the sliding member being slidingly shifted by the rotating operation of the handling member between its first and second positions; and
the locking means being operatively connected to the handling member to lock the cover in association with the rotating operation of the handling member to slidingly shift the sliding member from its second position to its first position and to release the locking of the cover in association with the rotating operation of the handling member to slidingly shift the sliding member from its first position to its second position.

10. A motion picture camera according to claim 9, further comprising:
urging means to always bias the blocking means toward its blocking position, said urging means being operatively connected to the blocking means and the blocking means being forcibly shifted to its non-blocking position resisting the biasing force of the urging means by the cover when the cover closes the housing chamber.

11. A sound motion picture camera adapted to utilize a sound film cartridge housing a photographic film having a magnetic coating for recording sound signals and having an opening for permitting sound signal recording on said coating, comprising:
a cartridge housing chamber to house said cartridge;
a cover for said housing chamber, said cover being movable against the chamber to close and open said chamber;
magnetic head means for recording sound signals magnetically on said magnetic coating of the film, said head means being fixedly disposed within the housing chamber at a location to be positioned in the opening of the cartridge when the cartridge is housed in the chamber, with at least the magnetic coating of the film being brought into contact with the head means at said position for sound recording;
pressure pad means adapted to contact at least the magnetic coating of the film with the head means for sound recording, said pad means being movable between a first position to proceed into the opening of the cartridge for pressing at least the magnetic coating of the film against the head means and a second position to retreat out of said opening for releasing said pressing ;
supporting means to support said pad means so that said pad means can be shifted between its first and second positions, said pad means being fixedly disposed on said supporting means;
change over means to shift the pad means between its first and second positions, said change over means being manually operable from outside of the camera and operatively connected to the supporting means so that the pad means is shifted between its first and second positions through the supporting means;
blocking means operatively engaging the change over means to prohibit operation of the change over means to shift the pad means from its second position to its first position, said blocking means being movable between a first position to prohibit operation of the change over means and a second position to enable the operation of the change over means, and shifted to said second position by the cover when said cover closes the housing chamber;
urging means to always bias the blocking means toward its first position, said urging means being operatively connected to the blocking means, with said blocking means being shifted to its second position by said cover to resist the biasing force of the urging means when the cover closes the housing chamber; and
locking means to lock the cover in its position closing the housing chamber, said locking means being operatively connected to the change over means to lock the cover in association with the operation of the change over means to shift the pad means from its second position to its first position and to release the locking of said cover in association with the operation of the change over means to shift the pad means from its first position to its second position;
with both the setting of the sound recording and the locking of the cover being accomplished simultaneously by one operation of the change over means only when the cover closes the cartridge housing chamber.

12. A sound motion picture camera adapted to utilize a sound film cartridge housing a sound signal recording photographic film, comprising:
a cartridge housing chamber to house the cartridge;
a cover for the housing chamber, said cover being movable against the housing chamber to close and open the housing chamber;
sound signal recording head means for recording sound signals on said film, said head means being fixedly disposed in the housing chamber with at least a portion of the film being made to contact with the recording head means for sound recording;
pressure means adapted to contact at least a portion of the film with the recording head means for sound recording, said pressure means being movable between a first position to press the film against the recording head means for sound recording and a second position to release said pressing;
setting means to shift the pressure means between its first and second positions, said setting means being operatively connected to the pressure means and movable between a first position to shift the pressure means to its first position and a second position to shift the pressure means to its second position;
blocking means operatively engaging with the setting means to block the shifting of the setting means from its second position to its first position, said blocking means being movable between a blocking position to block the setting means and a non-blocking position to release said blocking and forcibly shifted to said non-blocking position by the cover when said cover closes the housing chamber;
urging means to always bias the blocking means towards the blocking position, said blocking means being forcibly shifted to the non-blocking position by the cover resisting the biasing force of the urging means when the cover closes the housing chamber;
handling means to shift the setting means between its first and second positions, said handling means being manually operable from outside of the camera and operatively connected to the setting means to be operated only when the blocking means is at the non-blocking position; and
locking means to lock the cover in a state in which the housing chamber is closed, said locking means being operatively connected to the handling means to lock the cover in association with the operation of the handling means to shift the setting means from its second position to its first position, and to release the locking of said cover in association with the operation of the handling means to shift the setting means from its first position to its second position;
both the setting of the sound recording and the locking of the cover being accomplished simultaneously by one operation of the handling means only when said cover is in a state closing the housing chamber.

13. A motion picture camera adapted to utilize a film cartridge housing a sound signal recording photographic film, comprising:
a cartridge housing chamber to house the cartridge;
a cover for said housing chamber, said cover being movable against the housing chamber for closing and opening the chamber;
sound signal recording means for recording sound signals on said film, said recording means being adapted to be changed over between a first state to functionally couple with the film for sound recording and a second state to release the coupling with the film to prohibit sound recording on the film;

film transporting means to continuously run the film along the recording means for sound recording, said transporting means being adapted to be changed over and set between a first state to be functionally coupled with the film for continuously running the film and a second state to release the coupling with the film for terminating the running drive of the film;

change over means to change over the recording means and the transporting means between their respective first and second states, said change over means being operatively connected to both the recording means and the transporting means and manually operable from outside of the camera;

blocking means operatively engaging with the change over means to prohibit operation of the change-over means to change over the recording means and the transporting means from their respective second states to their first states, said blocking means being movable between a first position to prohibit the operation of the change over means and a second position to enable the operation of the change over means, and shifted from its first position to its second position by the cover when said cover closes the housing chamber; and locking means to lock the cover in a position in which the housing chamber is closed, said locking means being operatively connected to the change over means to lock the cover in association with the operation of the change over means to change over the recording means and the transporting means from their respective second states to their first states, and to release the locking of the cover in association with the operating of the change over means to change over the recording means and the transporting means from their respective first states to the second states;

both the setting of the sound recording and the locking of the cover being simultaneously accomplished by one operation of the change over means only when said cover is in a state to close the cartridge housing chamber.

14. A motion picture camera according to claim 13, wherein the photographic film has a magnetic track for sound signal recording, the sound signal recording means including:

a sound signal recording head member for recording sound signals magnetically on said track, said member being fixedly disposed in the housing chamber with at least the magnetic track of the film being made to contact with the head member for sound recording; and a first pressure member for contacting at least the magnetic track of the film with the head member for sound recording, said first pressure member being movable between a first position to press at least the magnetic track of the film against the head member and a second position to release said pressing;

the film transporting means including:

a film driving member to run the film continuously along the head member, said driving member being placed at a position within the housing chamber and the film being made to operatively engage with the driving member for continuous running; and a second pressure member to operatively engage the film with the driving member for continuous running, said second pressure member being movable between a first position to press the film against the driving member and a second position to release said pressing;

the change over means being operatively connected to both the first and second pressure members to shift said first and second pressure members between their respective first and second positions.

15. A motion picture camera according to claim 14, wherein the change over means includes;

a setting member to shift the first and second pressure members between their respective first and second positions, said setting member being operatively connected to both of said first and second pressure members and movable between a first position to shift both of the first and second pressure members to their respective first positions and a second position to shift both of said first and second pressure members to their respective second positions; and a handling member to shift the setting member between its first and second positions, said handling member being manually operable from outside of the camera and operatively connected to the setting member;

the blocking means operatively engaging the setting member at its first position, with the operation of the handling member to shift the setting member from its second position to its first position being prohibited by blocking the shifting of the setting member from its second position to its first position;

the locking means being operatively connected to the handling member to lock the cover in association with the operation of the handling member to shift the setting member from its second position to its first position and to release said locking of the cover in association with the operation of the handling member to shift the setting member from its first position to its second position.

16. A motion picture camera according to claim 15, further comprising:

urging means to always bias the blocking means toward its first position, said urging means being operatively connected to the blocking means, with the blocking means being forcibly shifted to its second position by the cover resisting the biasing force of said urging means when the cover closes the housing chamber.

17. A motion picture camera adapted to utilize a film cartridge housing a sound signal recording photographic film, comprising:

a cartridge housing chamber to house the cartridge;

a cover for said housing chamber, said cover being movable against said chamber for closing and opening the chamber;

sound signal recording means for recording sound signals on said film, said recording means being changed over between a first state to functionally couple with the film for sound recording and a second state to release said coupling with the film to prohibit sound recording on the film;

film transporting means to continuously run the film along the recording means for sound recording, said transporting means being adapted to be changed over between a first state to functionally couple with the film for continuously running the film, and a second state to release said coupling with the film to prohibit the running drive of the film;

setting means to change over the recording means and the transporting means between their respective first and second states, said setting means being operatively connected to said recording means and the transporting means and movable between a first position to change over the recording means and the transporting means to their respective first states and a second position to change over the same to their respective second states;

blocking means operatively engaging with the setting means to block the shifting of the setting means from the second position to its first position, said blocking means being movable between a first position to block said setting means and a second position to release said blocking, and forcibly shifted to its second position by the cover when said cover closes the housing chamber;

handling means to shift the setting means between its first and second positions, said handling means being manually operable from outside of the camera and operatively connected to the setting means to operate only when the blocking means is at its second position; and locking means to lock the cover in a position closing the housing chamber, said locking means being operatively connected to the handling means to lock said cover in association with the operation of the handling means to shift the setting means from its second position to its first position, and to release the locking of said cover in association with the operation of the handling means to shift the setting means from its first position to its second position;

both the setting of sound recording and the locking of the cover being simultaneously effected by one operation of the handling means only when said cover is at a position closing the cartridge housing chamber.--

18. A motion picture camera according to claim 17, wherein the film cartridge has an opening for permitting sound signal recording on the film, the sound signal recording means including:

a sound signal recording head for recording sound signals on the film, said head being fixedly disposed in the housing chamber at a location to be positioned within the opening when the cartridge is housed in the chamber, with at least a portion of the film being made to contact with the head for sound recording; and a pressure pad to contact at least a portion of the film with the recording head for sound recording, said pressure pad being movable between a first position to proceed into said opening of the cartridge and press at least said portion of the film against the recording head and a second position to retreat from said opening for releasing said pressing;

said film transporting means including:

a capstan to continuously run the film along the recording head, said capstan being disposed within the housing chamber at a location to be positioned in the opening when the cartridge is housed in the housing chamber and said film being made to operatively engage with said capstan for continuous running; and a pressure roller to operatively engage the film with the capstan for continuous running, said pressure roller being movable between the first position to press the film against the capstan and a second position to release said pressing;

the setting means being operatively connected to the pressure pad and the pressure roller to shift the pressure pad and the pressure roller between their respective first and second positions.

19. A motion picture camera according to claim 18, further comprising:

supporting means to so support the pressure pad and the pressure roller the pressure pad and the pressure roller can be shifted between their respective first and second positions, said supporting means being operatively connected to the setting means to shift the pressure pad and pressure roller between their respective first and second positions in association with the shifting of the setting means between its first and second positions.

20. A motion picture camera according to claim 19, wherein the setting means includes;

a sliding member slidingly shifted between a first position to shift the pressure pad and the pressure roller to their respective first positions and a second position to shift the pressure pad and the pressure roller to their respective second positions, said sliding member being operatively connected to the supporting means to shift both the pressure pad and pressure roller between their respective first and second positions through the supporting means by slidingly shifting between the first and second positions thereof;

the handling means being operatively connected to said sliding member to slidingly shift said sliding member between its first and second positions, and the blocking means operatively engaging with the sliding member at its first position to block the sliding shift of the sliding member from its second position to its first position.

21. A motion picture camera according to claim 20, wherein the handling means includes:

a handling member rotatable against the camera to slidingly shift the sliding member between its first and second positions, said handling member being manually operable from outside of the camera and operatively connected to the sliding member;

the sliding member being slidingly shifted between its first and second positions by rotating operation of the handling member, and the locking means being operatively connected to the handling member to lock the cover in association with the rotating operation of the handling member to slidingly shift member from its second position to its first position, and to release the locking of said cover in association with the rotating operation of the handling member to slidingly shift the sliding member from its first position to its second position 22. A motion picture camera according to claim 21, further comprising:

urging means operatively connected to the blocking means to always bias the blocking means toward its first position;

the blocking means being forcibly shifted to its second position by the cover resisting the biasing force of said urging means when the cover closes the housing chamber.

23. A sound motion picture camera adapted to utilize a sound film cartridge housing a photographic film having a magnetic coating for recording sound signals and having an opening for permitting sound signal recording on said coating, comprising: a cartridge housing chamber to house the cartridge;

a cover for said housing chamber, said cover being movable with respect thereto to close and open the chamber;

a magnetic head for recording sound signals magnetically on said magnetic coating of the film, said head being fixedly disposed within the housing chamber at a location to be positioned in the opening of the cartridge when the cartridge is housed in the chamber, at least said magnetic coating of the film being made to contact with the head at said position for sound recording;

a pressure pad to contact at least said magnetic coating of the film with the head for sound recording, said pressure pad being movable between a first position to proceed into the opening of the cartridge for pressing at least the magnetic coating of the film against the head and a second position to retreat from the opening for releasing said pressing;

a capstan to continuously run the film along the head for sound recording, said capstan being disposed within the housing chamber at a location to become positioned in said opening of the cartridge when said cartridge is housed in the chamber, the film being made to operatively engage with the capstan at said position for continuous running;

a pressure roller to operatively engage the film with the capstan for continuous running, said pressure roller being movable between a first position at which the pressure roller is closely pressed against the capstan sandwiching the film therebetween and a second position at which said roller is largely separated from the capstan to facilitate insertion and removal of the film into and from between the capstan and the pressure roller;

supporting means to so support the pressure pad and pressure roller that said pad and roller can be shifted between respective first and second positions, said supporting means being movable so as to effect shifting of said pad and roller between their respective first and second positions;

change over means to shift said pad and roller between their respective first and second positions, and change over means being manually operable from outside of the camera and operatively connected to the supporting means for shifting said pad and roller between their respective first and second positions through the supporting means;

blocking means operatively engaging with the change over means to prohibit the operation of said change over means to shift said pad and roller from their respective second positions, to their respective first positions, said blocking means being movable between a first position to prohibit the operation of the change over means and a second position to enable said operation of the change over means, and shifted to its second position by the cover when said cover closes the housing chamber;

urging means to always bias the blocking means toward its first position, said urging means being operatively connected to the blocking means, said blocking means being shifted to its first position by the cover resisting the biasing force of said urging means when the cover closes the housing chamber; and locking means to lock the cover in a position closing the housing chamber, said locking means being operatively connected to the change over means to lock the cover in association with the operation of said change over means to shift the pad and roller from their respective second positions to their respective first positions and to release the locking of said cover in association with the operation of the change over means to shift the pad and roller from their respective first positions to their respective second positions;

both the setting of the sound recording and the locking of the cover being simultaneously effected by one operation of the change over means only when said cover is in the position closing the cartridge housing chamber.

24. A sound motion picture camera adapted to utilize a sound film cartridge housing a sound signal recording photographic film, comprising:

a cartridge housing chamber to house the cartridge;

a cover for said housing chamber, said cover being movable with respect thereto for closing and opening said chamber;

sound signal recording head means for recording sound signals on said film, said head means being fixedly disposed in said housing chamber with at least a portion of the film being made to contact with the recording head means for sound recording;

first pressure means to contact at least the portion of the film with the recording head means, said pressure means being movable between a first position to press the film against the recording head means for sound recording and a second position to release said pressing;

film driving means to continuously run the film along the head means for sound recording, said driving means being disposed at a position close to the head means within the housing chamber, the film being made to operatively engage with the driving means for continuous running;

second pressure means to operatively engage the film with the driving means for continuous running, said second pressure means being movable between a first position closely pressed against the driving means sandwiching the film therebetween and a second position separated from the driving means to facilitate insertion and withdrawal of the film into and from between the driving means and the second pressure means;

setting means to shift the first and second pressure means between their respective first and second positions, said setting means being operatively connected to said first and second pressure means and being movable between a first position to shift both of the first and second pressure means to their respective first positions and a second position to shift the first and second pressure means to their respective second positions;

blocking means operatively engaging with the setting means to block the shifting of the setting means from its second position to its first position, said blocking means being movable between a blocking position to block the setting means and a non-blocking position to release said blocking, and being forcibly shifted to said non-blocking position by the cover when said cover closes the housing chamber;

urging means to always bias the blocking means toward the blocking position, said blocking means being forcibly shifted to the non-blocking position resisting the biasing force of said urging means;

handling means to shift the setting means between its first and second positions, said handling means being manually operable from outside of the camera and operatively connected to the setting means to be operable only when the blocking means is at the non-blocking position; and locking means to lock the cover in a position closing the housing chamber, said locking means being operatively connected to the handling means to lock the cover in association with the operation of the handling means to shift the setting means from its second position to its first position and to release said locking of the cover in association with the operation of the handling means to shift the setting means from its first position to its second position;

both the setting of the sound recording and the locking of the cover being simultaneously effected by one operation of the handling means only when said cover is in the position closing the cartridge chamber.

* * * * *